Jan. 4, 1949.   G. A. LYON   2,458,492
WHEEL COVER
Filed Jan. 8, 1945
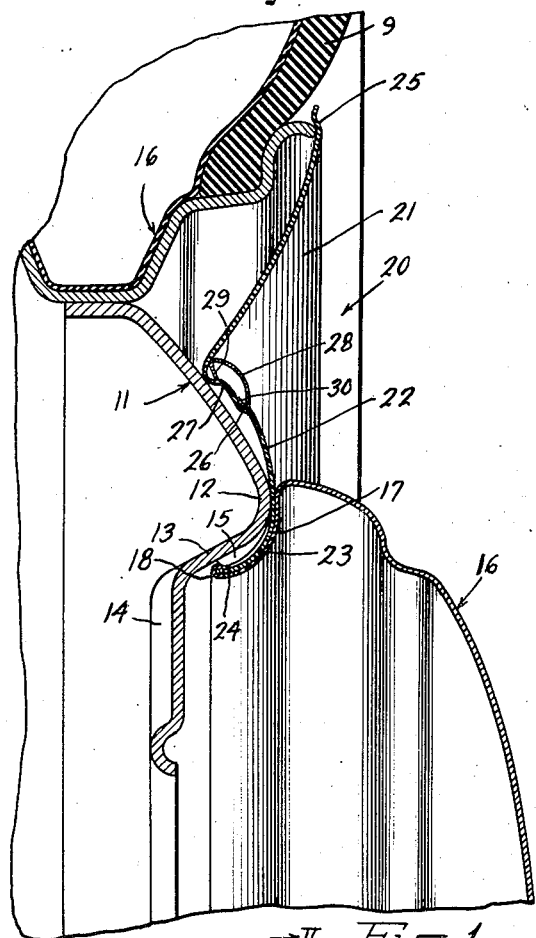
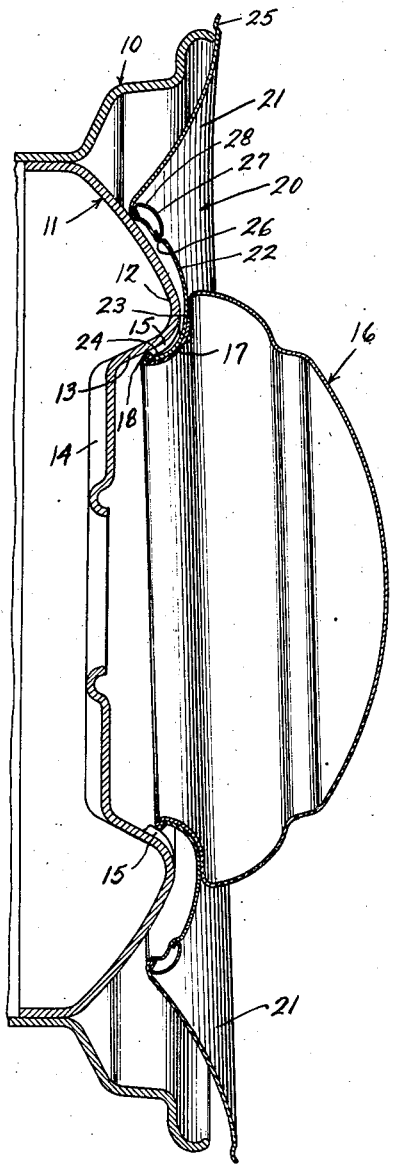
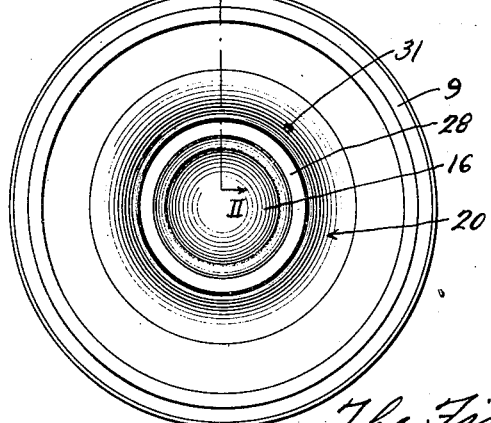
Inventor
GEORGE ALBERT LYON
by The Firm of Charles W. Hills
Attys.

Patented Jan. 4, 1949

2,458,492

UNITED STATES PATENT OFFICE 2,458,492

WHEEL COVER

George Albert Lyon, Allenhurst, N. J.

Application January 8, 1945, Serial No. 571,852

9 Claims. (Cl. 301—37)

This invention relates to a wheel structure and more particularly to a wheel trim or cover for an automobile wheel.

An object of this invention is to provide a wheel cover or trim which is simple in construction and yet is easily applicable to and removable from an automobile wheel.

Still another object of this invention relates to the provision of a multi-part wheel cover including an outer plastic part and a central hub cap part, the outer part being manually deflectable for enabling removal of both it and the hub cap.

In accordance with the general features of this invention there is provided in a cover structure for a wheel including a flanged tire rim part, a body part provided with spaced protuberances for retaining thereon a hub cap, a cover including an annulus of resiliently pliable material for substantially concealing exposed side flanges of the rim part and having an inner edge retainingly attached to the hub cap, the annulus also being provided with a free outer edge manually accessible for flexure and for forcibly pulling the cap and said annulus out of retained engagement with said protuberances.

Other objects and features of the invention will more fully appear from the following detailed description taken in connection with the accompanying drawings which illustrate a single embodiment thereof, and in which Figure 1 is a side view of a multiple part wheel cover showing it applied to an automobile wheel;

Figure 2 is an enlarged fragmentary cross-sectional view taken on substantially line II—II of Figure 1, looking in the direction indicated by the arrows; and Figure 3 is a cross-sectional view similar to Figure 2, but showing the outer annulus in a partially deflected position in which the cover is being pulled out of retaining engagement with the protuberances on the wheel.

As shown on the drawing:

The reference character 9 designates generally a conventional automobile tire and tube carried by a conventional multi-flanged drop center tire rim 10. This tire rim part is supported on a body or load bearing part 11, which, as is customary, may comprise a shell-like metallic stamping.

The body part 11 has a curved outer convex nose 12 terminating in an inclined central portion 13, which in turn terminates in a radial central bolt-on flange 14. This bolt-on flange 14 is adapted to be attached in the usual way by bolts or cap screws (not shown) to a part of an automobile axle.

The inclined portion 13 of the body part has extending generally radially inwardly therefrom a plurality of spaced protuberances 15, which are adapted to detachably retain a hub cap on the central part of a wheel. This wheel structure is now conventional in the automobile wheel art, and it is the aim of this invention to provide a wheel cover including a hub cap part 16 for cooperation with this wheel.

The hub cap part 16 comprises a hollow metallic stamping and has an underturned curved skirt or flange 17 which terminates at its inner extremity in a continuous turned edge 18 adapted to be resiliently snapped over and behind the protuberances 15 into retained engagement therewith.

Carried by the hub cap part 16 is a plastic annulus designated generally by the reference character 20. This annulus may be made of any suitable pliable or plastic material, and in fact may be either molded or pressed from sheet stock. Excellent results may be obtained by making this annulus of synthetic thermoplastic, such for example, as ethyl cellulose.

The annulus 20 includes an outer inclined curved portion 21, an inner portion 22 terminating in a rearwardly curved portion 23 having its inner edge snapped behind the bead edge 18 of the hub cap part. It will be noted that the turned portion 23 conforms to the configuration of the hub cap skirt 17, and is in fact tightly nested in the skirt. In practice the plastic part 20 may be applied to the hub cap part 16 by pressing it from the rear side of the part 16 into interlocked engagement with the skirt 17 and the hub cap part edge 18.

This arrangement permits of the portion 22 being clamped by the outer margin of the hub cap tightly against the wheel body nose 12.

The outer portion 21 of the annulus has its outer edge slightly turned at 25 so as to overhang an outer edge of the tire rim part in close proximity to the outer side wall of the tire. This portion 21 extends generally radially and axially inwardly from edge 25 to the wheel body part 11, and is of such configuration that, in use, it will appear to constitute a continuation of the curved outer side wall of the tire. This effect can be further enhanced by giving the external surface of portion 21 a white or eggshell finish, in which event the portion appears to constitute a white side wall part of the tire thereby giving the effect of the wheel having a massive tire extending clear down to the body part 11.

The two portions 21 and 22 of the annulus 20 extend in divergent directions and have their junction reinforced by a metallic snap-on hollow bead 28. This bead has an underturned outer edge 29 which may be formed into fingers adapted to retainingly embrace a shoulder 27 formed in the plastic portion 22. Also the plastic portion 22 is provided with a slight indentation 26 in which an inner turned edge 30 of the bead is adapted to seat. In this manner, the bead may be readily snapped into retained engagement with the shoulder 27 in the plastic and will serve to reinforce the junction of the two divergent cover portions 21 and 22.

From the foregoing it is clear that I have provided a composite cover structure comprising a hub cap part 16 and a flexible annulus 20, which structure, when applied to the wheel, substantially covers the entire exposed outer side of the wheel. In applying this structure to the wheel, it is pressed axially against the wheel until the inner edge 18 of the hub cap part resiliently snaps over and behind the retaining protuberances 15.

If it is so desired, as best shown in Figure 1, the cover portion 21 may be provided with a valve stem hole 31 through which the valve stem may be extended. On the other hand, if a short valve stem is used so that it will not project through the portion 21, then access may be had to the same by manually flexing the portion 21 away from the tire to an extent sufficient to permit of the application of a hose nozzle to the valve stem.

In Figure 3 I have illustrated how the cover may be removed. In the process of removal, the operator grasps one edge of the portion 21 and pulls it away from the tire rim to a position such as that shown in the lower part of Figure 3. In the course of this pulling of the plastic part of the cover, the inner edge 18 of the hub cap is progressively pulled from behind the protuberances 15 until the cover is completely removed from the wheel. This is simpler than using a pry-off tool and eliminates the possibility of the wheel or cover being marred by the sharp edge of a pry-off tool, such as a screw driver.

Attention is also directed to the fact that a combination of plastic and metal in this cover of my invention lends itself to many highly desirable contrasting color effects. The metal part such as the bead 28 and the hub cap 16 may be given lustrous external finishes whereas the exposed plastic portions 21 and 22 may be given color finishes.

I claim as my invention:

1. In a cover structure for a wheel including a flanged tire rim part, a body part provided with hub cap retaining protuberances, and a hub cap detachably held on the wheel by said protuberances, a cover including an annulus of resiliently pliable material for substantially concealing exposed side flanges of the rim part and having an inner edge retainingly attached to the hub cap, said annulus having a free outer edge manually accessible for flexure said annulus being so constructed and related to the hub cap and the protuberances that when the annulus is manually pulled generally axially outwardly away from the wheel it results in forcibly pulling the cap and said annulus out of retained engagement with said protuberances, said annulus being of generally channel-like cross-sectional shape with an outer portion disposed over the rim flanges and an inner portion disposed over a portion of the body part and extending to the attachment on the hub cap, and a reinforcing bead at the junction of said two cover portions.

2. In a cover structure for a wheel including a flanged tire rim part, a body part provided with hub cap retaining protuberances, and a hub cap detachably held on the wheel by said protuberances, a cover including an annulus of resiliently pliable material for substantially concealing exposed side flanges of the rim part and having an inner edge retainingly attached to the hub cap, said annulus having a free outer edge manually accessible for flexure and for forcibly pulling the cap and said annulus out of retained engagement with said protuberances, said annulus including divergent portions with their junction point over the body part and also being provided with a reinforcing means at the junction.

3. In a wheel structure wherein a tire rim is joined with a load sustaining body part having a generally axially outwardly protruding nose portion surrounding an axially inwardly depressed bolt-on flange and the nose portion has radially inwardly projecting integral protuberances thereon, and a hub cap engageable in snap on and off relationship with said protuberances, a cover comprising divergently related convexly cross-sectioned inner and outer portions formed integrally from resiliently pliable material, said inner portion conforming generally to said nose portion and in assembly being interposed between the nose portion and the hub cap at said protuberances, said outer portion being locally manually deflectable from adjacent to said tire rim to apply dislodging force through said inner portion to said hub cap to disengage the hub cap from the protuberances, and reinforcing means located at the junction of said cover portions and providing a relatively stiff bead against which the pulling force on said outer cover portion is directly applicable and thereby transmitted to and through said inner cover portion to dislodge the hub cap without substantial deflection of said inner cover portion.

4. In combination in a cover structure for a wheel including a tire rim and a body portion, an annulus formed from resiliently pliable material and including a radially outer portion adapted to enter into concealing relation to the tire rim and an inner portion adapted to be in concealing relation to the body, said cover portions being divergently related and defining therebetween a generally axially outwardly opening groove, a hub cap constructed for snap on and off assembly with said body, said inner cover portion being assembled with the inner portion of the hub cap, and a reinforcing bead member having a turned edge disposed within said groove, said outer cover portion being manually deflectable away from said tire rim and being adapted to be pulled generally axially outwardly against said reinforcing bead and said inner cover portion to force said inner cover portion to dislodge the hub cap from the wheel body.

5. In a cover structure for a wheel including a tire rim and a body portion, an annulus made of resiliently pliable material and including inner and outer portions divergently related and defining a generally axially inwardly located groove opening outwardly from the cover, a reinforcing bead secured to said inner cover portion and having a turned edge extending into said groove into abutment with the junction of said cover portions, said outer cover portion being deflectable outwardly relative to the tire rim to be manually grasped and pulled generally axially away from the wheel, and a hub cap engaging said inner cover portion for securing the cover in place on the wheel body and being adapted to be dislodged from the wheel body by force exerted thereagainst by said inner cover portion as an incident to outward pulling of said outer cover portion in the application of outward force thereby against said reinforcing bead.

6. In combination in a wheel cover, inner and outer circular cover portions divergently related and defining a circular groove at the junction therebetween, said cover being formed from relatively thin resilient material, and a hollow reinforcing bead member having inner and outer turned edges, with the outer edge in said groove, said inner cover portion having a shoulder engageable by the outer turned edge portion of the bead and a slight indentation spaced generally radially inwardly and providing a seat for the inner turned edge of the bead, whereby the bead is adapted to be snapped into engagement with the cover.

7. A wheel cover of the character described comprising a cover member including a pair of annular sections divergently related, the radially inner of said sections having a pair of radially spaced shoulders, with the radially outermost of the shoulders adjacent the juncture of the cover sections, and a reinforcing bead having marginal formations respectively engaging said shoulders for retaining the bead in place.

8. A wheel cover of the character described comprising a cover member including a pair of annular sections divergently related, the radially inner of said sections having a pair of radially spaced shoulders, with the radially outermost of the shoulders adjacent the juncture of the cover sections, and a reinforcing bead having marginal formations respectively engaging said shoulders for retaining the bead in place, the radially outer marginal formation of the bead comprising an underturned annular biting flange engaging the radially outer shoulder of the inner cover section in wedging biting relation.

9. In a cover structure for a wheel including a tire rim and a body part, a cover including an outer annular portion for disposition over the tire rim and an inner cover portion joining said outer portion convergently and providing therebetween an axially outwardly opening groove, an annular reinforcing bead extending into said groove, said bead having a turned inner edge, and said inner cover portion having a groove therein receptive of said turned inner bead edge.

GEORGE ALBERT LYON.

REFERENCES CITED

The following references are of record in the file of this patent:

UNITED STATES PATENTS

| Number | Name | Date |
|---|---|---|
| 1,234,387 | Pugh | July 24, 1917 |
| 2,107,015 | Short | Feb. 1, 1938 |
| 2,212,037 | Lyon | Aug. 20, 1940 |
| 2,293,007 | Lyon | Aug. 11, 1942 |
| 2,298,669 | Wood | Oct. 13, 1942 |
| 2,317,393 | Lyon | Apr. 27, 1943 |
| 2,368,254 | Lyon | Jan. 30, 1945 |